(12) United States Patent
Buyse et al.

(10) Patent No.: US 10,435,154 B1
(45) Date of Patent: Oct. 8, 2019

(54) TETHERED DRONE SYSTEM WITH SURVEILLANCE DATA MANAGEMENT

(71) Applicant: RSQ-Systems SPRL, Genval (BE)

(72) Inventors: Mathieu Buyse, Genval (BE); Jean Marc Coulon, Sant Julia de Loria (AD); Mike Blavier, Vilvoorde (BE)

(73) Assignee: RSQ-Systems SPRL, Genval (BE)

( * ) Notice: Subject to any disclaimer, the term of this patent is extended or adjusted under 35 U.S.C. 154(b) by 0 days.

(21) Appl. No.: 16/046,691

(22) Filed: Jul. 26, 2018

(51) Int. Cl.
| | |
|---|---|
| *B64C 39/02* | (2006.01) |
| *H04N 7/18* | (2006.01) |
| *G07C 5/00* | (2006.01) |
| *H04W 4/90* | (2018.01) |
| *G08B 25/10* | (2006.01) |
| *H04W 4/44* | (2018.01) |

(52) U.S. Cl.
CPC ............ *B64C 39/024* (2013.01); *G07C 5/008* (2013.01); *G08B 25/10* (2013.01); *H04N 7/181* (2013.01); *H04W 4/44* (2018.02); *H04W 4/90* (2018.02); *B64C 2201/127* (2013.01); *B64C 2201/148* (2013.01)

(58) Field of Classification Search
CPC ............ B64C 39/024; B64C 2201/127; B64C 2201/148
See application file for complete search history.

(56) References Cited

U.S. PATENT DOCUMENTS

2017/0235018 A1\* 8/2017 Foster .................. B64C 39/024
702/5

\* cited by examiner

*Primary Examiner* — Obafemi O Sosanya
(74) *Attorney, Agent, or Firm* — Michael Best & Friedrich LLP (57) ABSTRACT

In one embodiment, the disclosure provides a method of event auditing. The method of event auditing includes receiving sensor data at a base station from a sensor of an unmanned aerial vehicle ("UAV"), transmitting a controls signal to the UAV based on the sensor data, communicatively coupling the base station with an external evidenced repository, formatting a portion of the sensor data, and transmitting the formatted sensor data to the external evidence repository. In some embodiments, the base station is mounted to an anchor vehicle. In some embodiments, the UAV is communicatively coupled with the base station via a tether. In some embodiments, the formatting the sensor data includes formatting a second portion of sensor data to generate formatted sensor data based, at least in part, on an identity of the external evidence repository.

23 Claims, 7 Drawing Sheets

TETHERED DRONE SYSTEM WITH SURVEILLANCE DATA MANAGEMENT

BACKGROUND

The present disclosure relates to a tethered surveillance drone system. More specifically, the present disclosure relates to systems and methods of event auditing and data storage.

SUMMARY

In one embodiment, the disclosure provides a method of event auditing. In some embodiments, the method of event auditing includes receiving sensor data at a base station from a sensor of an unmanned aerial vehicle ("UAV"), transmitting a controls signal to the UAV based on the sensor data, communicatively coupling the base station with an external evidenced repository, formatting a portion of the sensor data, and transmitting the formatted sensor data to the external evidence repository. In some embodiments, the base station is mounted to an anchor vehicle. In some embodiments, the UAV is communicatively coupled with the base station via a tether. In some embodiments, transmitting the control signal to the UAV is based on a first portion of sensor data. In some embodiments, the formatting the sensor data includes formatting a second portion of sensor data to generate formatted sensor data based, at least in part, on an identity of the external evidence repository.

In some embodiments, the method further includes receiving a request to transition the UAV between a docked configuration and an aerial configuration and transitioning the UAV between the docked configuration and the aerial configuration. In some embodiments, the request is received at the base station. In some embodiments, the request is received from a portable electronic device. In some embodiments, the base station is coupled to a controller of the anchor vehicle. In some embodiments, the request to transition the UAV comprises data indicative of an operating state of the anchor vehicle. In some embodiments, the request comprises the first portion of the sensor data.

In some embodiments, the formatting the sensor data comprises encrypting the second portion of the sensor data. In some embodiments, the formatting comprises selectively including metadata. In some embodiments, the formatting comprises formatting the second sensor data to comply with one or more standards of continuity of evidence. In some embodiments, the first external evidence repository comprises a remote server. In some embodiments, the communicatively coupling comprises coupling via wireless communication.

In some embodiments, the base station is communicatively coupled to a mobile data terminal ("MDT") of the anchor vehicle. In some embodiments, the MD is communicatively coupled to the remote server via wireless communication. In some embodiments, a second external evidence repository comprises a storage medium of the MDT. In some embodiments, the method further includes formatting the second portion of the sensor data to generate second formatted sensor data. In some embodiments, the method further includes transmitting the second formatted sensor data to the second external evidence repository.

In some embodiments, the disclosure provides one or more non-transitory computer-readable media having computer-executable instructions recorded there, the computer-executable instructions configured to cause a computer processor to perform various operations. In some embodiments, the operations include receiving, at a base station, sensor data from at least one sensor of a UAV, transmitting a control signal to the UAV based on the sensor data, communicatively coupling the base station with an external evidence repository, formatting a portion of the sensor data, and transmitting the formatted sensor data to the external evidence repository. In some embodiments, the base station is mounted to an anchor vehicle. In some embodiments, the UAV is communicatively coupled with the base station via a tether. In some embodiments, the transmitting the control signal to the UAV is based, at least in part, on a first portion of the sensor data. In some embodiments, the formatting a second portion of the sensor data is based, at least in part, on an identity of the external evidence repository.

In some embodiments, the operations further include receiving a request to transition the UAV between a docked configuration and an aerial configuration. In some embodiments, the operations further include transitioning the UAV between the docked configuration and the aerial configuration. In some embodiments, the request is received at the base station. In some embodiments, the request is received from a portable electronic device. In some embodiments, the base station is coupled to a controller of the anchor vehicle. In some embodiments, the request comprises data indicative of an operating state of the anchor vehicle. In some embodiments, the request comprises the first portion of sensor data.

In some embodiments, the formatting comprises selectively including metadata. In some embodiments, the formatting comprises encrypting the second portion of the sensor data. In some embodiments, the formatting complies with one or more standards of continuity of evidence. In some embodiments, the external evidence repository comprises aa remote server. In some embodiments, the communicatively coupling comprises coupling via wireless communication. In some embodiments, the base station is communicatively coupled to an MDT. In some embodiments, the MDT is communicatively coupled to the remote server via wireless communication.

In some embodiments, a second external evidence repository comprises a storage medium of the MDT. In some embodiments, the operations further include formatting the second portion of the sensor data to generate second formatted sensor data. In some embodiments, the operations further include transmitting the second formatted sensor data to the second external evidence repository.

In some embodiments, the disclosure provides a system for event auditing. In some embodiments, the system includes a base station including a controller and a UAV. In some embodiments, the controller is communicatively coupled with an external evidence repository. In some embodiments, the UAV is coupled to the base station via a tether. In some embodiments, the controller is configured for receiving sensor data from at least one sensor of the UAV. In some embodiments, the controller is configured for transmitting a control signal to the UAV to control a propulsion system of the UAV. In some embodiments, the transmitting the control signal is based, at least in part, on the sensor data. In some embodiments, the control signal is based, at least in part, on the sensor data. In some embodiments, the controller is configured for formatting a portion of the sensor data to generate formatted sensor data. In some embodiments, the formatting the sensor data is based, at least in part, on an identity of the external evidence repository. In some embodiments, the controller is further configured for transmitting the formatted sensor data to the external evidence repository.

In another embodiment the disclosure provides a method of {text}.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
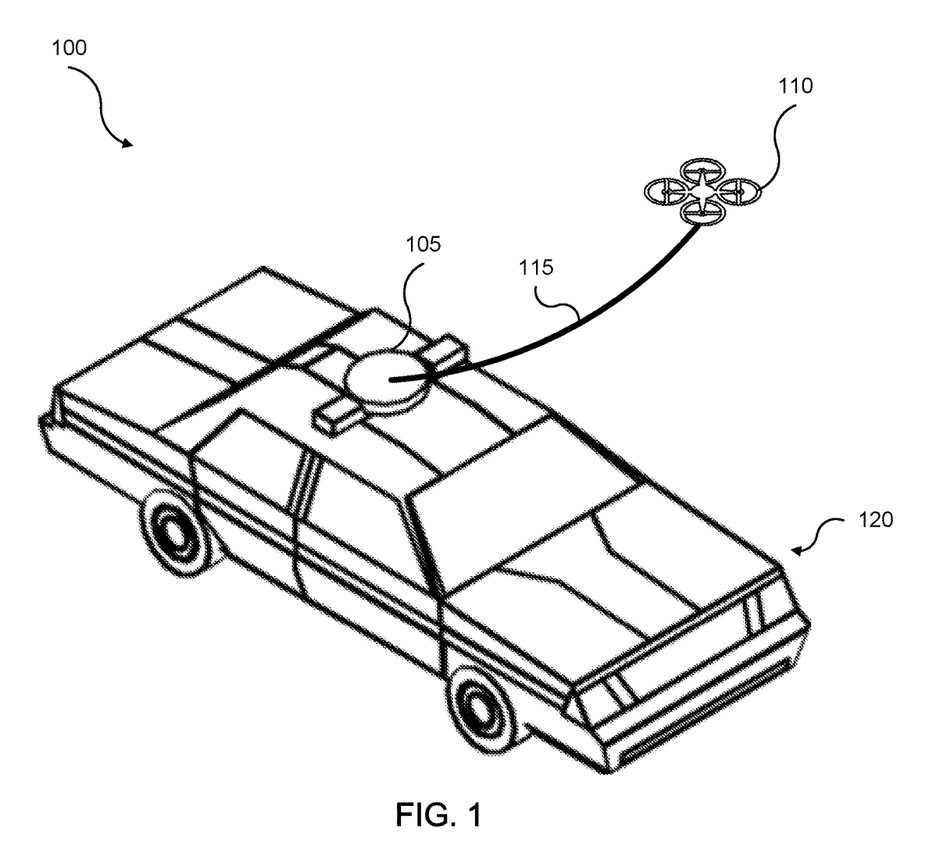
FIG. 1 illustrates an event auditing system, according to some embodiments.

FIG. 1 illustrates an event auditing system 100, according to some embodiments. The event auditing system 100 includes a base station 105, an unmanned aerial vehicle ("UAV") 110, and a tether 115 extending between the base station 105 and the UAV 110. The base station 105 is mounted on an anchor vehicle 120, and may be integrated into a light-bar, as shown. In the illustrated embodiment, the anchor vehicle 120 is a patrol car, but may be any other vehicle, such as an ambulance, fire engine, motorcycle, watercraft, or other emergency vehicle. The UAV includes a propulsion system to keep the UAV 110 aloft, as well as one or more cameras and sensors. The tether 115 is configured to secure the UAV 110 to the base station 105, as well as communicate power from the base station 105 to the UAV 110, such as for the propulsion system. The tether 115 is also configured to transmit data signals between the base station 105 and the UAV 110, such as for the base station 105 to control the propulsion system or a camera, or receive data from the cameras or sensors. Accordingly, deployment, flight, and recovery of the UAV 110 may be controlled by the base station 105. For example, the base station 105 may deploy the UAV 110 to monitor an area around the anchor vehicle 120, such as with the camera or sensors. Alternatively, the UAV 110 may maintain autonomous control of itself, while receiving power from the base station 105. In some embodiments, flight control and/or sensor control is handled collaboratively by the base station 105 and the UAV 110. When not in flight, the UAV 110 is configured for docking with the base station 105. The base station 105 includes housing and a cover system that retain the UAV 110 when the UAV 110 is docked with the base station 105. For example, the housing may include a lid which protects the UAV 110 from tampering or inclement weather.

Figure 2:
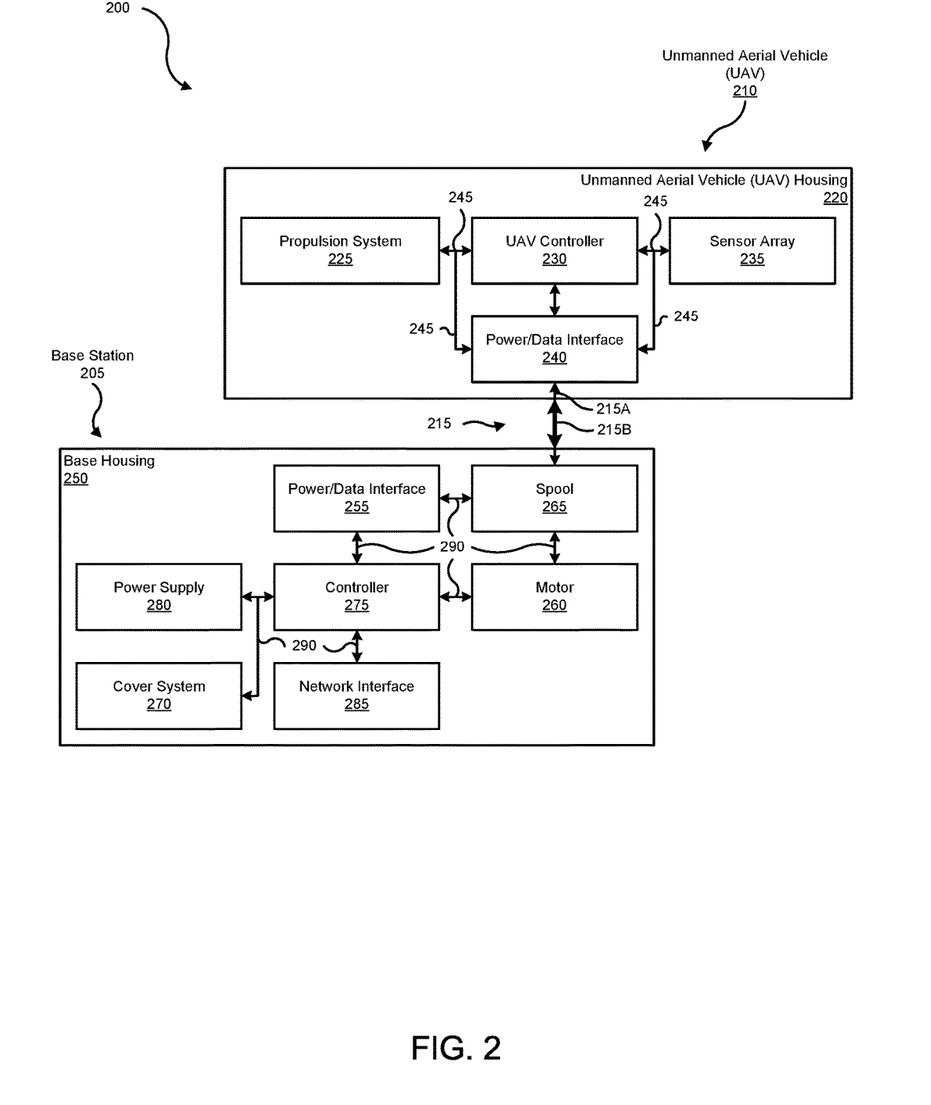
FIG. 2 is a block diagram of an event auditing system, according to some embodiments.

FIG. 2 illustrates a block diagram of an event auditing system 200, according to some embodiments. The event auditing system 200 includes a base station 205, a UAV 210, and a tether 215 between the UAV 210 and the base station 205. The UAV 210 includes a UAV housing 220, such as a lightweight aluminum, fiberglass, polymer, or carbon-fiber shell. The UAV 210 further includes a propulsion system 225, a UAV controller 230, a sensor array 235, and a power/data interface 240 coupled to the UAV housing 220. The propulsion system 225, UAV controller 230, and sensor array 235 are electronically coupled to the power/data interface 240 via electronic links 245. The controller is electronically coupled to the propulsion system 225 and the sensor array 235 via electronic links 245. Accordingly, power and/or data may be supplied directly to one or more of the propulsion system 225, the sensor array 235, and the controller directly from the power/data interface 240, or may be mediated by the UAV controller 230. For example, Power-over-Ethernet ("POE") may be received at the power/data interface 240 and supplied to the UAV controller 230. In some embodiments, the UAV controller 230, which may include various electronic memories, processors, embedded circuitry, and the like, receives the POE, separates the supplied power and the communicated data, adapts the supplied power based on a required voltage or current of the propulsion system 225 and the sensor array 235, and provides the power and data to the propulsion system 225 and the sensor array 235.

In some embodiments, the UAV controller 230 receives sensor data from one or more sensors of the sensor array 235 and communicates the sensor data to the power/data interface 240. In other embodiments, the sensor array 235 communicates sensor data from one or more sensors to the power/data interface 240 directly. In other embodiments, sensor data from a first plurality of sensors may be transmitted from the sensor array 235 to the UAV controller 230 and sensor data from a second plurality of sensors is transmitted from the sensor array 235 to the power/data interface 240. For example, in the case that the sensor array 235 includes an accelerometer and one or more cameras, the accelerometer data may be communicated to the UAV controller 230, while the image data from the one or more cameras is communicated to the power/data interface 240. By way of further example, image data may be communicated to both the UAV controller 230 and the power/data interface 240. Accordingly, computational requirements of the system may be distributed or scaled between the UAV controller 230 and other controllers of the system 200 as desired.

In some embodiments, the sensor array 235 includes a plurality of cameras disposed circumferentially about a bottom side of the UAV housing 220. In some embodiments, the sensor array 235 includes cameras variously configured for different ambient light conditions, distances, resolutions, framerates, fields of view, etc. In some embodiments, the sensor array 235 further includes at least one sensor configured for detecting a relative orientation between the UAV 210 and the base station 205. In some embodiments, the relative orientation may be sensed with one or more magnetometers, accelerometers, GPS sensors, and the like. In other embodiments, the relative orientation may be sensed with the one or more cameras. For example, various image and video analysis techniques may be applied to image data from a plurality of cameras to sense or determine a relative orientation between the UAV 210 and the base station 205. Further, in some embodiments, one or more of the cameras may be controlled based on the relative orientation of the UAV 210 or between the UAV 210 and the base station 205.

The propulsion system 225 includes one or more thrust-generating devices, such as various propellers, fans, jets, rockets, thrusters, and the like. The propulsion system 225 receives power and control signals from the power/data interface 240, the UAV controller 230, or a combination thereof to control thrust vectoring of respective thrust-generating devices. Accordingly, the propulsion system 225 is thus configured to provide sustained or indefinite flight for the UAV 210, for example, static or dynamic flight as desired. In some embodiments, the propulsion system 225 is controlled based on a relative orientation between the UAV 210 and the base station 205. For example, the propulsion system 225 may be controlled to maintain a static position of the UAV 210 relative to the base station 205 or follow one or more paths relative to the base station 205.

In addition to the electronic links 245, the power/data interface 240 is also communicably coupled to the base station 205 via the tether 215. In the illustrated embodiment, the tether 215 includes a wired connection 215A configured to transmit POE between the base station 205 and the UAV 210. In some embodiments, the tether 215 may include discrete wired power and data connections. In some embodiments, the tether 215 includes a protective sheathe 215B. In some embodiments, the tether 215 is sheathed with a thermoplastic sheathe, such as polyvinyl chloride (PVC). Alternatively, or in addition, the protective sheathe 215B flexibly and mechanically couples the UAV housing 220 to the base station housing. Accordingly, various stresses on the tether 215 are distributed by the protective sheathe 215B, rather than being passed on to the wired connection 215A. In some embodiments, the tether 215 is connected directly to a base station housing 250. In other embodiments, the tether 215 is coupled to a spool 265, which is coupled to the base station housing 250.

The base station housing 250 is configured for mounting to an anchor vehicle (e.g. vehicle 120 of FIG. 1), and is made of a resilient material, such as an aluminum, fiberglass, polymer, or carbon-fiber shell. The base station housing 250 further includes a power/data interface 255, a motor 260 coupled to the spool 265, a cover system 270, and a base station controller 275 coupled to the power/data interface 255 and the motor 260. The base station controller 275 is further coupled to a power supply 280, a network interface 285, and the cover system 270. The power/data interface 255 is substantially similar to the power/data interface 240 of the UAV 210, and is coupled to the wired connection 215A of the tether 215. In the illustrated embodiment, the power/data interface 255 is coupled to the wired connection 215A at the spool 265. Accordingly, power and data (e.g. POE) may be communicated between the power/data interface 255 of the base station 205 to the power/data interface 240 of the UAV 210 via the tether 215. The spool 265 is further coupled to the motor 260 and thereby configured for adjustment of the tether 215. Accordingly, the tether 215 may be extended or retracted as desired. Additionally, the motor 260 and spool 265 may be configured for applying a force to the protective sheathe 215B of the tether 215. For example, the motor 260 and spool 265 may be configured for electronic braking in high winds, or to reel in a damaged UAV 210. Accordingly, deployment, flight, and recovery of the UAV 210 are improved. Although a spool 265, motor 260, and electronic braking have been described and illustrated, any suitable tensioning or tether adjustment mechanisms may be used as desired.

The base station controller 275 is coupled to the various components of the base station 205 via electronic links 290. The controller receives electrical power from the power supply 280. In the illustrated embodiment, the power supply 280 is coupled to an electrical system of the vehicle to which the base station 205 is mounted, as well as to adapt power received from the vehicle based on the voltage/current requirements of one or more components of the base station 205 and/or the UAV 210. In some embodiments, the power supply 280 further includes one or more energy storage devices, such as lithium-ion batteries.

The cover system 270 receives power from the power supply 280 and configured to open and close a cover of the housing, such as a lid or segmented door. When the UAV 210 is docked with the base station 205, the cover is configured to enclose the base station 205, the tether 215, and the UAV 210. When the UAV 210 is in an aerial configuration, the cover is configured to minimize interference with movement of the UAV 210 or tether 215. In some embodiments, the cover system 270 includes one or more motors, elastic members, latches, or other devices configured for opening the cover, closing the cover, or maintaining the cover in an open or closed position. Actuation of the cover system 270 is controlled by the base station controller 275. Accordingly, the UAV 210 is securely retained within the base station housing 250, for example, while the anchor vehicle is in motion.

The base station controller 275 includes various electronic processors and memories storing program instructions executable by the processors to execute functionality described herein. The base station controller 275 is further coupled to the network interface 285. The network interface 285 is configured for wired and wireless electronic communication. For example, the network interface 285 may include one or more antennas and may be configured to communicate over one or more wireless networks using protocols such as Wi-Fi, Bluetooth, WLAN, CDMA, etc. In some embodiments, the network interface 285 is communicatively coupled with an external data source. For example, the network interface 285 may be coupled with a mobile data terminal ("MDT") in the anchor vehicle over a wired connection, or may be coupled to a remote server over a mobile broadband network. In some embodiments, the network interface 285 connects to server via virtual private network ("VPN") client which complies with one or more cryptographic standards related to maintaining continuity of evidence. For example, the VPN client may comply with Federal Information Processing Standard ("FIPS") Publication 140-2, (FIPS PUB 140-2). Accordingly, the base station controller 275 may securely communicate with both the UAV 210 and external data sources with the tether 215 and the network interface 285, respectively.

The base station controller 275 is configured to control the UAV 210, for example, in conjunction with the UAV controller 230, or independently. For example, the base station controller 275 may be configured to control one of the propulsion system 225 and the sensor array 235 while the UAV controller 230 controls the other of the propulsion system 225 and the sensor array 235. The base station controller 275 is configured to receive sensor data from the sensor array 235. In some embodiments, the base station controller 275 is configured to transmit sensor data to an external data source in real-time. For example, the base station controller 345 may be communicatively coupled with a dedicated emergency channel for first responders, such as the First Responder Network Authority, FirstNet, and transmit sensor data to FirstNet in real-time. In some embodiments, the base station controller 275 is configured to store sensor data in one or more electronic memories of the base station controller 275. In further embodiments, the base station controller 275 is configured to transmit a first portion of sensor data in real-time while simultaneously storing a second portion in the one more electronic memories of the base station controller 275. Accordingly, the base station controller 275 may be configured for record redundancy (e.g. when the first portion and the second portion comprise substantially similar sensor data) or reduced bandwidth requirements (e.g. when the first portion of sensor data is smaller than the second portion of sensor data).

The base station controller 275 is further configured to receive data from an external data source. In some embodiments, the base station controller 275 is configured to control the UAV 210 based, at least in part, on data from an external data source. For example, the base station controller 275 may transition the UAV 210 from a docked configuration to an aerial configuration in response to receiving an event notification signal, such as an operating state of the anchor vehicle or a request from a portable electronic device associated with a user of the anchor vehicle. The operating state may include any various operating states of the anchor vehicle, such as an operating state of the drivetrain (e.g. Park, Neutral, Drive, etc.), an operating state of the electrical system (e.g. Off, Accessory, or Drive), or any other operating state of the anchor vehicle. For example, the base station controller 275 may be configured to transition the UAV 210 between a docked configuration and an aerial configuration in response to the anchor vehicle operating state being changed from "Drive" to "Park." By way of additional example, the base station controller 275 may be configured to transition the UAV 210 between an aerial configuration in response to the anchor vehicle operating state being changed from "Accessory" to "Off." Further, an operating state of the vehicle may include activation or deactivation of various steering and traction assistance systems, such as in response to aggressive braking, turning, or loss of traction. In some embodiments, the base station controller 275 is configured to control the UAV 210 based, at least in part, on sensor data received from the sensor array 235. For example, the base station controller 275 may transition the UAV 210 from an aerial configuration to a docked configuration based on data indicative of unfavorable environmental conditions from one or more sensors of the sensor array 235.

Figure 3:
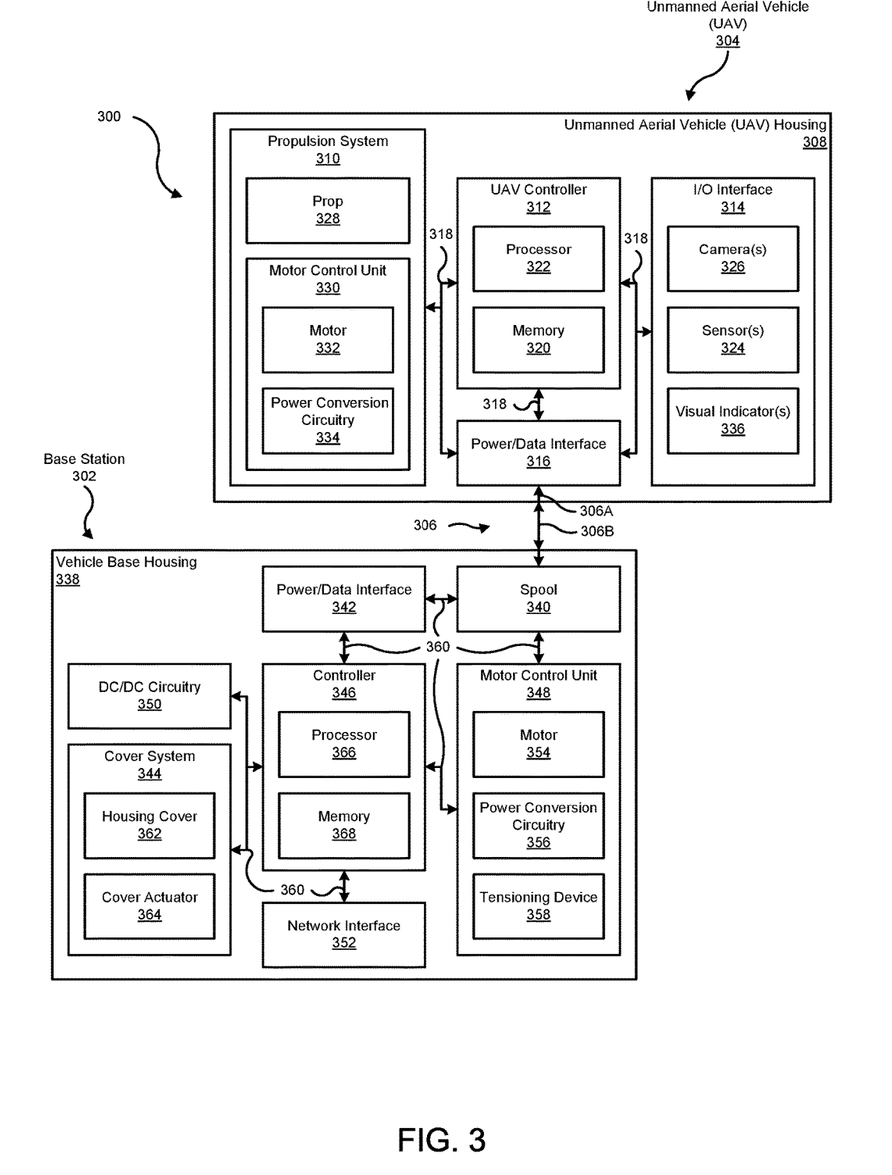
FIG. 3 is a block diagram of an event auditing system, according to some embodiments.

FIG. 3 illustrates a specific embodiment of an event auditing system 300, also referred to as a surveillance system. The event auditing system 300 includes a base station or surveillance platform 302, a remote sensor platform or UAV 304, and a tether 306 between the UAV 304 and the base station 302. The UAV 304 includes UAV housing 308, such as a lightweight aluminum, fiberglass, polymer, or carbon-fiber shell. The UAV 304 further includes a propulsion system 310, a UAV controller 312, an Input/Output ("I/O") interface 314, and a power/data interface 316 coupled to the UAV housing 308. The propulsion system 310, UAV controller 312, and I/O interface 314 are electronically coupled to the power/data interface 316 via electronic links 318. Additionally, the UAV controller 312 is electronically coupled to the propulsion system 310 and the I/O interface 314 via electronic links 318. Accordingly, power and/or data may be supplied directly to one or more of the propulsion system 310, the I/O interface 314, and the UAV controller 312 directly from the power/data interface 316, or may be mediated by the UAV controller 312. For example, Power-over-Ethernet ("POE") may be received at the power/data interface 316 and supplied to the UAV controller 312. In some embodiments, the UAV controller 312, which include one or more electronic memories 320, and one or more processors or embedded circuitry 322, and the like, receives the POE, separates the supplied power and the communicated data, adapts the supplied power based on a required voltage or current of the propulsion system 310 and the I/O interface 314, and provides the power and data to the propulsion system 310 and the I/O interface 314.

In some embodiments, the UAV controller 312 receives sensor data from one or more sensors 324 or cameras 326 of the I/O interface 314 and communicates the sensor data to the power/data interface 316. In other embodiments, the I/O interface 314 communicates sensor data from one or more sensors 324 or cameras 326 to the power/data interface 316 directly. In other embodiments, sensor data from a first plurality of sensors 324 and cameras 326 may be transmitted from the I/O interface 314 to the UAV controller 312 and sensor data from a second plurality of sensors 324 and cameras 326 is transmitted from the I/O interface 314 to the power/data interface 316. For example, in the case that the I/O interface 314 includes an accelerometer and one or more cameras, the accelerometer data may be communicated to the UAV controller 312, while the image data from the one or more cameras is communicated to the power/data interface 316. By way of further example, image data may be communicated to both the UAV controller 312 and the power/data interface 316. Accordingly, computational requirements of the system may be distributed or scaled between the processor or embedded circuitry 322 of the UAV controller 312 and other controllers of the system as desired.

In some embodiments, the I/O interface 314 includes a plurality of cameras 326 disposed circumferentially about a bottom side of the UAV housing 308. In some embodiments, the I/O interface 314 includes cameras 326 variously configured for different ambient light conditions, distances, resolutions, framerates, fields of view, etc. In some embodiments, the I/O interface 314 further includes at least one sensor 324 configured for detecting a relative orientation between the UAV and the base station 302. In some embodiments, the relative orientation may be sensed with one or more magnetometers, accelerometers, GPS sensors, and the like. In other embodiments, the relative orientation may be sensed with the one or more cameras 326. For example, various image and video analysis techniques may be applied to image data from a plurality of cameras 326 to sense or determine a relative orientation between the UAV 304 and the base station 302. Further, in some embodiments, one or more of the cameras 326 may be controlled based on the relative orientation of the UAV 304 or between the UAV 304 and the base station 302.

Further, in some embodiments, at least one camera 326 is controlled to track an object or person. Similarly, the UAV 304 may be controlled to track an object or person. Accordingly, evidence collection, storage, and transmission may be improved.

In some embodiments, the I/O interface 314 includes one or more visual indicators 336. In some embodiments, the visual indicators 336 may be visible, infrared, or ultraviolet LEDs. In some embodiments, the visual indicators 336 are configured to receive control signals from the UAV controller 312, the power/data interface 316, or a combination thereof. The visual indicators 336 are configured for indicating one or more state of the UAV, the base station, the anchor vehicle, or a combination thereof. In some embodiments, the visual indicators 336 are further configured to provide illumination, such as an area around the anchor vehicle and base station, or an object in view of one of the cameras 326.

In some embodiments, the I/O interface 314 includes one or more of an ultrasonic sensor, a temperature sensor, an airspeed sensor, a barometric sensor, and an orientation sensor 324. In further embodiments, the propulsion system 310 is controlled based, at least in part, on data signals received from the I/O interface 314. For example, the UAV 304 may be transitioned between an aerial configuration to a docked configuration in response to unfavorable environmental conditions being detected with the one or more sensors 324

The propulsion system 310 includes at least one prop 328 and a motor control unit ("MCU") 330. The MCU 330 includes at least one motor 332 and associated power conversion circuitry 334, for example, to transform, invert, or rectify received power. The MCU 330 receives power and control signals from the power/data interface 316, the UAV controller 312, or a combination thereof. The MCU 330 receives power and control signals at the power conversion circuitry 334 and provides power to the motor 332 to control thrust vectoring of prop 328. Accordingly, the propulsion system 310 is thus configured to provide sustained or indefinite flight for the UAV 304, for example, static or dynamic flight as desired. In some embodiments, the propulsion system 310 is controlled based on a relative orientation between the UAV 304 and the base station 302. For example, the propulsion system 310 may be controlled to maintain a static position of the UAV 304 relative to the base station 302 or follow one or more paths relative to the base station 302.

In addition to the electronic links 318, the power/data interface 316 is also communicably coupled to the base station 302 via the tether 306. In the illustrated embodiment, the tether 306 includes a wired connection 306A configured to transmit POE between the base station 302 and the UAV 304. In some embodiments, the tether 306 may include discrete wired power and data connections 306A. In some embodiments, the tether 306 includes a protective sheathe 306B. In some embodiments, the tether 306 is sheathed with a thermoplastic sheathe, such as polyvinyl chloride (PVC). Alternatively, or in addition, the protective sheathe 306B flexibly and mechanically couples the UAV housing 308 to a vehicle base housing 338, such as between a pair of respective coupling mechanisms on the UAV housing 308 and the vehicle base housing 338. Accordingly, various stresses on the tether 306 are distributed by the protective sheathe 306B, rather than being passed on to the wired connection 306A. In some embodiments, the tether 306 is axially aligned with a center of mass of the UAV 304. For example, in the case that the UAV 304 is symmetric under rotation, the tether 306 may be configured for attachment to the bottom of the UAV 304 along a central axis. Accordingly, torques produced by the props 328 about the attachment point of the tether 306 may be reduced. In some embodiments, the tether 306 is connected directly to vehicle base housing 338. In other embodiments, the tether 306 is coupled to a spool 340, which is coupled to the vehicle base housing 338.

The vehicle base housing 338 is configured for mounting to a anchor vehicle (e.g. anchor vehicle 120 of FIG. 1), and is made of a resilient material, such as an aluminum, fiberglass, polymer, or carbon-fiber shell. The vehicle base housing 338 further includes a power/data interface 342, an MCU 348 coupled to the spool 340, a cover system 344, and a base station controller 346 coupled to the power/data interface 342 and the MCU 348. The base station controller 346 is further coupled to DC/DC circuitry 350, a network interface 352, and the cover system 344. The power/data interface 342 is substantially similar to the power/data interface 316 of the UAV 304, and is coupled to the wired connection 306A of the tether 306. In the illustrated embodiment, the power/data interface 342 is coupled to the wired connection 306A at the spool 340. Accordingly, power and data (e.g. POE) may be communicated between the power/data interface 342 of the base station 302 to the power/data interface 316 of the UAV 304 via the tether 306. The spool 340 is further coupled to the MCU 348 and thereby configured for adjustment of the tether 306.

The MCU 348 includes a motor 354, associated power conversion circuitry 356, and a tensioning device 358, such as an electronic brake. Accordingly, the MCU 348 controls the motor 354 to extend or retract the tether 306 as desired. Additionally, the MCU 348 is configured to control the motor 354 and the tensioning device 358 to apply a force to the protective sheathes of the tether 306. For example, the MCU 348 and spool 340 may be configured for electronic braking in high winds, or to reel in a damaged UAV 304. Accordingly, deployment, flight, and recovery of the UAV 304 are improved. Although a spool, motor, and electronic braking have been described and illustrated, any suitable tensioning or tether adjustment mechanisms may be used as desired.

The base station controller 346 is coupled to the various components of the base station 302 via electronic links 360. The controller receives electrical power from the DC/DC circuitry 350. In the illustrated embodiment, the DC/DC circuitry 350 is coupled to an electrical system of the anchor vehicle to which the base station 302 is mounted, as well as to adapt power received from the anchor vehicle based on the voltage/current requirements of one or more components of the base station 302 and/or the UAV 304. In some embodiments, the DC/DC circuitry 350 further includes one or more energy storage devices, such as lithium-ion batteries.

The cover system 344 receives power from the DC/DC circuitry 350 and configured to open and close a cover 362 of the housing, such as a lid or segmented door. The cover system 344 includes a cover actuator 364, which is configured for opening and/or closing the housing cover 362. When the UAV 304 is docked with the base station 302, the housing cover 362 is configured to enclose the base station 302, the tether 306, and the UAV 304. When the UAV 304 is in an aerial configuration, the housing cover 362 is configured to minimize interference with movement of the UAV 304 or tether 306. In some embodiments, the cover actuator 364 includes one or more motors, elastic members, latches, or other devices configured for opening the cover, closing the cover, or maintaining the cover in an open or closed position. Actuation of the cover system 344 is controlled by the base station controller 346. Accordingly, the UAV 304 is securely retained within the vehicle base housing 338; such as while the anchor vehicle is in motion.

The base station controller 346 includes at least one electronic processor 366 and at least one electronic memory 368, configured for storing program instructions executable by the processors 366 to execute functionality described herein. The base station controller 346 is further coupled to the network interface 352. The network interface 352 is configured for wired and wireless electronic communication. For example, the network interface 352 may include one or more antennas and may be configured to communicate over one or more wireless networks using protocols such as Wi-Fi, Bluetooth, WLAN, CDMA, etc. In some embodiments, the network interface 352 is communicatively coupled with an external data source. For example, the network interface 352 may be coupled with a mobile data terminal ("MDT") in the anchor vehicle over a wired connection, or may be coupled to a remote server over a mobile broadband network. In some embodiments, the network interface 352 connects to server via virtual private network ("VPN") client which complies with one or more cryptographic standards related to maintaining continuity of evidence. For example, the VPN client may comply with Federal Information Processing Standard ("FIPS") Publication-2, (FIPS PUB-2). Accordingly, the base station controller 346 may securely communicate with both the UAV 304 and external data sources with the tether 306 and the network interface 352, respectively.

The base station controller 346 is configured to control the UAV 304, for example, in conjunction with the UAV controller 312, or independently. For example, the base station controller 346 may be configured to control one of the propulsion system 310 and the I/O interface 314 while the UAV controller 312 controls the other of the propulsion system 310 and the I/O interface 314. The base station controller 346 is configured to receive sensor data from the I/O interface 314. In some embodiments, the base station controller 346 is configured to transmit sensor data to an external data source in real-time. In some embodiments, the base station controller 346 is configured to store sensor data in one or more electronic memories 368 of the base station controller 346 and/or electronic memories 320 of the UAV. In further embodiments, the base station controller 346 is configured to transmit a first portion of sensor data in real-time while simultaneously storing a second portion in the one more electronic memories 368. Accordingly, the base station controller 346 may be configured for record redundancy (e.g. when the first portion and the second portion comprise substantially similar sensor data) or reduced bandwidth requirements (e.g. when the first portion of sensor data is smaller than the second portion of sensor data).

In some embodiments, the base station controller 346 is configured to transmit sensor data in response to detecting a predetermined wireless signal. In some embodiments, the predetermined wireless signal may be detected from a portable electronic device or from a secure synchronization point, such as a wireless network of a police station or fire station. Accordingly, the predetermined wireless signal may be detected by the network interface 352. Subsequently, the base station controller 346 transmits sensor data, for example, to a remote evidence repository or other external data source, for secure storage.

The base station controller 346 is further configured to receive data from an external data source. In some embodiments, the base station controller 346 is configured to control the UAV 304 based, at least in part, on data from an external data source. For example, the base station controller 346 may transition the UAV 304 from a docked configuration to an aerial configuration in response to receiving an event notification signal, such as an operating state of the anchor vehicle or a request from an electronic device, such as a button within the vehicle or on the base station, or a portable electronic device associated with a user of the vehicle. For example, in some embodiments, the UAV 210 is transitioned from a docked configuration to an aerial configuration in response to receive an event notification signal indicative that a weapon in proximity of the UAV 210, such as a handgun of the user associated with the anchor vehicle, has been withdrawn from a smart holster. Further, in some embodiments, the location and/or flight pattern of the UAV 210 may be controlled from an electronic device, such as a joystick or touchscreen within the anchor vehicle, or the portable electronic device associated with the user of the anchor vehicle.

The operating state may include any various operating states of the anchor vehicle, such as an operating state of the drivetrain (e.g. Park, Neutral, Drive, etc.), an operating state of the electrical system (e.g. Off, Accessory, or Drive), or any other operating state of the anchor vehicle. For example, the base station controller 346 may be configured to transition the UAV 304 between a docked configuration and an aerial configuration in response to the anchor vehicle operating state being changed from "Drive" to "Park." By way of additional example, the base station controller 346 may be configured to transition the UAV 304 between an aerial configuration in response to the anchor vehicle operating state being changed from "Accessory" to "Off." For example, a user of the anchor vehicle may request that the UAV 304 be transitioned between a docked position and an aerial position, such as with a portable electronic device. Alternatively, or in addition, data from an external data source may be used to control a flight pattern or relative orientation of the UAV 304. In some embodiments, the base station controller 346 is configured to control the UAV 304 based, at least in part, on sensor data received from the I/O interface 314. For example, the base station controller 346 may transition the UAV 304 from an aerial configuration to a docked configuration based on data indicative of unfavorable environmental conditions from one or more sensors of the I/O interface 314.

Figure 4:
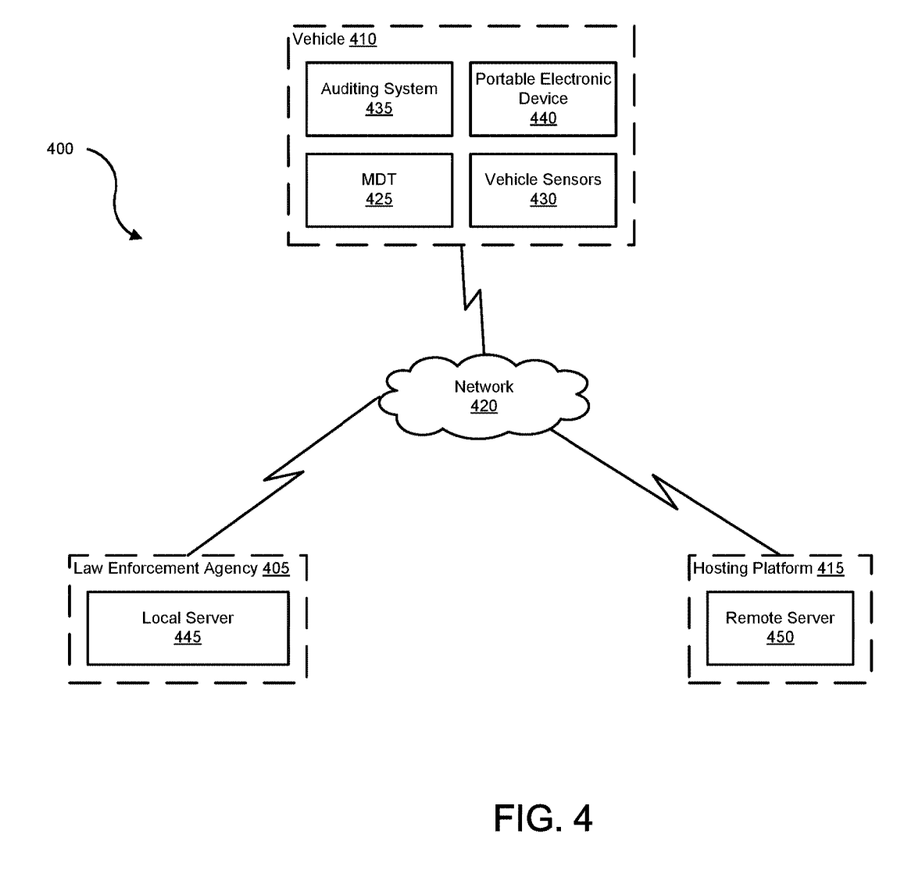
FIG. 4 is a block diagram of an event auditing system in a broader ecosystem, according to some embodiments.

FIG. 4 illustrates an event auditing system in a law enforcement ecosystem 400, according to some embodiments. The larger ecosystem 400 includes the law enforcement agency 405, a patrol vehicle 410, and a hosting platform 415, which are in communication over a network 420. The network 420 includes various wireless and wired communication system, such as the internet, configured for secure communication between the agency 405, patrol vehicle 410, and hosting platform 415. The vehicle 410 includes an MDT 425, such as a laptop, router, and associated electronics, configured for communicating with the agency 405 over the network 420.

The anchor vehicle 410 includes various sensors 430 associated with the anchor vehicle, such as one or more dash cameras, body cameras, or other imaging devices 430. An event auditing system 435 (e.g. substantially similar to systems 100, 200, or 300) is mounted on the anchor vehicle 410. A portable electronic device 440, such as an officer's cell phone, is also associated with the anchor vehicle 410. Accordingly, each of the MDT 425, the auditing system 435, and the portable electronic device 440 may be configured to communicate over the network 420 individually or in combination. For example, the auditing system 435 may be configured to connect to the network 420 via the MDT 425.

The law enforcement agency 405 includes a local server 445, including various processors and electronic memory devices, which is coupled to the network 420. The hosting platform 415 includes a remote server 450, including various processors and electronic memory devices, which is coupled to the network 420.

The MDT 425 is generally configured to receive image data captured by the anchor vehicle sensors 430. In some embodiments, the MDT 425 is configured to transmit the image data in real time over the network 420, for example, to the agency 405 and/or the hosting platform 415. In some embodiments, the MDT 425 includes one or more electronic storage devices. In some embodiments, the MDT 425 is configured to store image data in the electronic storage devices. In some embodiments, the auditing system 435 is configured to capture sensor data, such as image data, from one or more sensors of the auditing system 435. In some embodiments, the auditing system 435 is configured to store the sensor data in an electronic storage device of the auditing system 435. In some embodiments, the auditing system 435 is configured to transmit the sensor data to an external evidence repository, such as the electronic storage devices of the MDT 425, the local server 445 of the agency 405, and/or the remote server 450 of the hosting platform 415.

In some embodiments, the auditing system 435 is configured to combine sensor data from a plurality of sensors prior to transmission. For example, the auditing system 435 may be configured to combine image data from a plurality of cameras into a panorama or immersive live view data stream prior to transmission. In other embodiments, the auditing system 435 is configured to maintain sensor data in discrete streams. For example, the auditing system 435 may receive a plurality of streams of image data from a plurality of cameras, and would then transmit each respective stream individually or independently. Accordingly, fabrication of evidence or image data may be impeded. In some embodiments, one or more of the auditing system 435 and the MDT 425 is configured for formatting at least a portion of the sensor data, from one or more of the anchor vehicle sensors 430 and the auditing system 435, for example, prior to storage and/or transmission over the network 420. In some embodiments, formatting the data includes encrypting the data. In some embodiments, the respective data streams may be encrypted individually. In some embodiments, the formatting includes formatting the sensor data to comply with one or more standards of continuity of evidence or chain of custody (e.g. Interpol, Global Standards to Combat Corruption in Police Forces-Services, 4.12). In some embodiments, the formatting includes formatting based on an identity of the external evidence repository, such as the local server 445 or the remote server 450. As different hardware and software system have different configurations, the sensor data may be formatted for proper reception by the target system.

Figure 5:
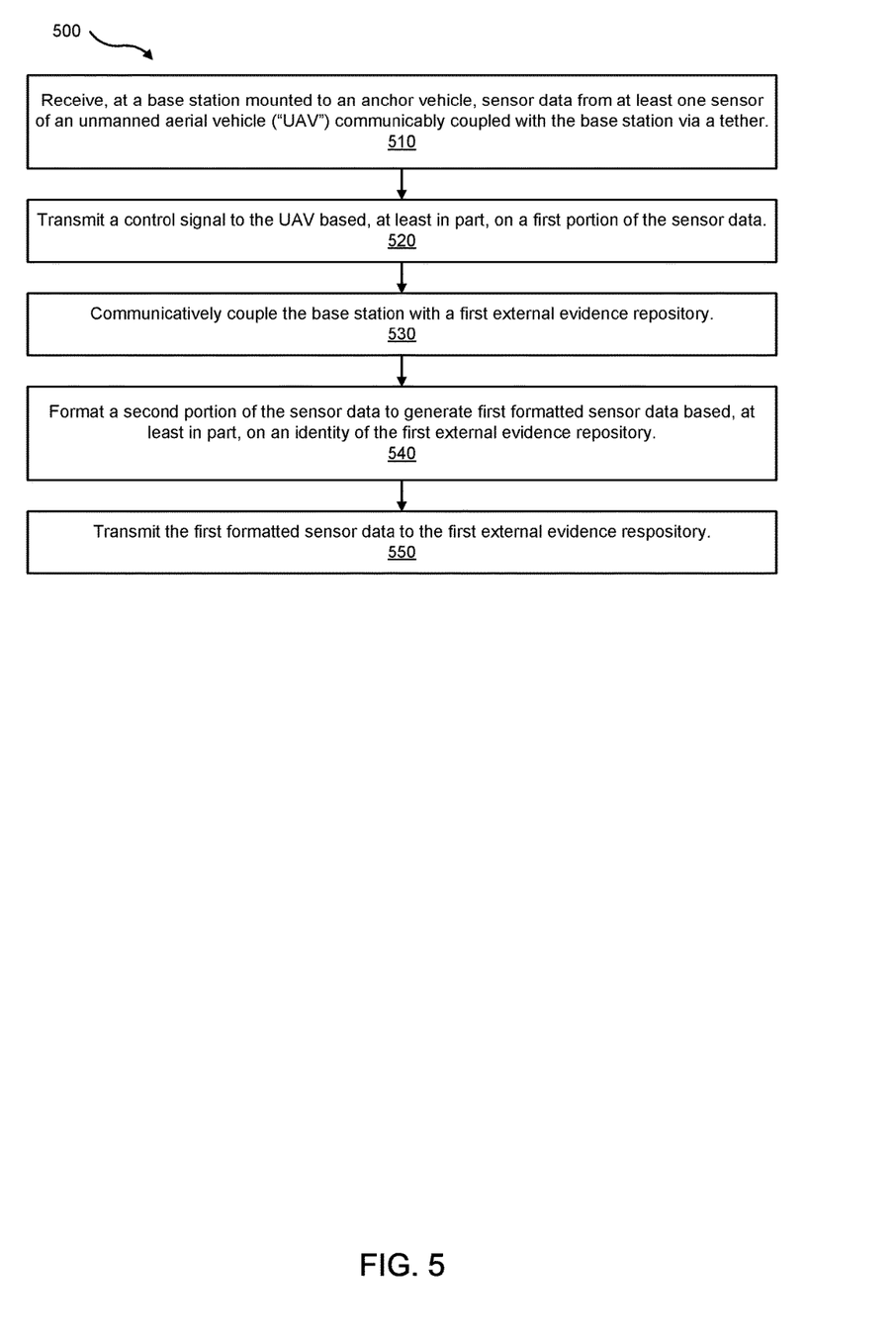
FIG. 5 is a flow diagram of a method of event auditing, according to some embodiments.

FIG. 5 is a flow diagram of a method 500 of event auditing, according to some embodiments. At block 510, sensor data from at least one sensor of an unmanned aerial vehicle ("UAV") is received at a base station mounted to an anchor vehicle. In some embodiments, the UAV is communicably coupled with the base station via a tether. The sensor data may include various sensor data from an ultrasonic sensor, a temperature sensor, an airspeed sensor, a barometric sensor, an orientation sensor, an accelerometer, or any other suitable sensor. In some embodiments, the sensor data includes a plurality of streams of image data from a respective plurality of cameras. At block 520, a control signal is transmitted to the UAV. In some embodiments, the control signal is transmitted from the base station. In some embodiments, the transmission of the control signal is based, at least in part, on a first portion of the sensor data. For example, during a period in which the UAV is in an aerial configuration, the control signal may be transmitted based on airspeed, orientation, and acceleration data, whereas data from the temperature sensor is simply logged. At block 530, the base station is communicably coupled with a first external evidence repository. For example, the base station may be coupled with a remote server of a hosting platform over one or more of wireless and wired communication.

At block 540, a second portion of the sensor data is formatted to generate first formatted sensor data. For example, orientation data, acceleration data, temperature data, and image data may be formatted to generate formatted sensor data. Accordingly, the first portion of the sensor data and the second portion of the sensor data need not be mutually exclusive portions of data, but rather commonly include data from one or more sensors. In some embodiments, the second portion of the sensor data is formatted base, at least in part, on an identity of the first external evidence repository. For example, different computer systems and servers may be configured to receive data having a specific format or formats. Accordingly, it may be advantageous to format the second data based, at least in part, on the identity of the external evidence repository. For example, the formatted may include encrypting the second portion of the sensor data.

In some embodiments, sensor data from respective sensors is encrypted in respective data streams. For example, a plurality of streams of image data from a respective plurality of cameras may each be encrypted individually. In some embodiments, the formatting includes selectively including metadata. For example, a portion of the sensor data may be used as metadata. For example, a time stamp or location of the UAV may be included with the sensor data. By way of further example, the metadata included with the sensor data may be encrypted as well. In some embodiments, the formatting includes formatting the second sensor data to comply with one or more standards of continuity of evidence. Various national and international organizations have established standards under which evidence may be deemed as admissible in court. In some embodiments, these standards include specify standards of capture, storage, transport, encryption, auditing, and modifying data. Accordingly, the formatting may include formatting the second sensor data to comply with one or more of these standards. Further, the encrypting of the sensor data and the formatting of the sensor data may be performed in any order, as desired. For example, the sensor data may first be encrypted, and then formatted based, at least in part, on the identity of the external evidence repository. Alternatively, the sensor data may be formatted based, at least in part, on the identity of the external evidence repository, and then encrypted. In further embodiments, the encryption and the formatting may be done substantially simultaneously.

At block 550, the first formatted sensor data is transmitted to the first external evidence repository. For example, the base station may transmit the first formatted sensor data to the first external evidence repository in real-time. Alternatively, the base station may first store the sensor data, either raw or formatted, in a storage device, such as a memory of the base station, and then transmit the formatted sensor data to the first external evidence repository at a later time. For example, the base station may store the sensor data while the anchor vehicle is on patrol, and then transmit the formatted sensor data upon detecting a secure synchronization point, such as a wireless network of a police station or fire station.

Figure 6:
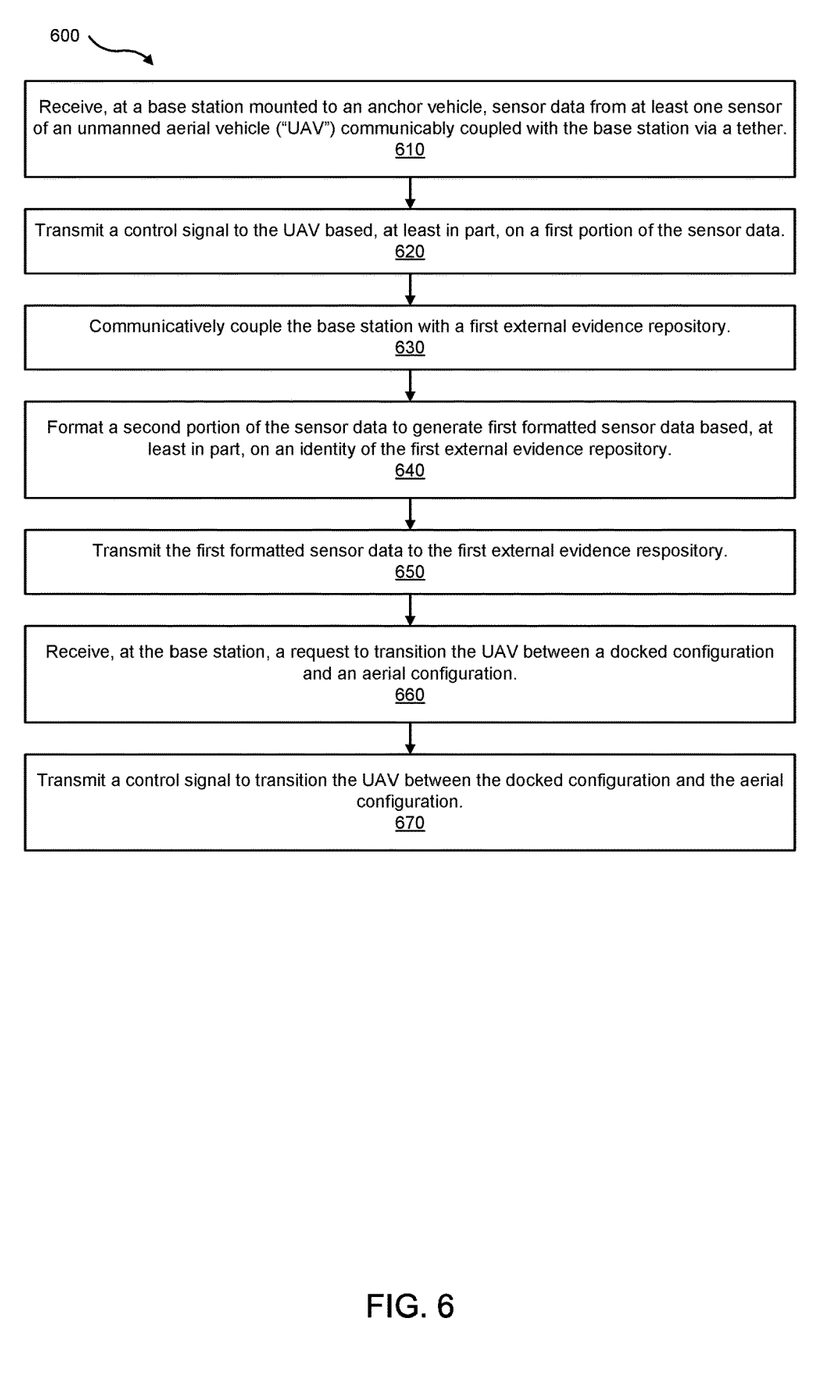
FIG. 6 is a flow diagram of a method of event auditing, according to some embodiments.

FIG. 6 is a flow diagram of a method 600 of event auditing, according to some embodiments. At block 610, sensor data from at least one sensor of an unmanned aerial vehicle ("UAV") is received at a base station mounted to an anchor vehicle. In some embodiments, the UAV is communicably coupled with the base station via a tether. The sensor data may include various sensor data from an ultrasonic sensor, a temperature sensor, an airspeed sensor, a barometric sensor, an orientation sensor, an accelerometer, or any other suitable sensor. In some embodiments, the sensor data includes a plurality of streams of image data from a respective plurality of cameras. At block 620, a control signal is transmitted to the UAV. In some embodiments, the control signal is transmitted from the base station. In some embodiments, the transmission of the control signal is based, at least in part, on a first portion of the sensor data. For example, during a period in which the UAV is in an aerial configuration, the control signal may be transmitted based on airspeed, orientation, and acceleration data, whereas data from the temperature sensor is simply logged. At block 630, the base station is communicably coupled with a first external evidence repository. For example, the base station may be coupled with a remote server of a hosting platform over one or more of wireless and wired communication.

At block 640, a second portion of the sensor data is formatted to generate first formatted sensor data. For example, orientation data, acceleration data, temperature data, and image data may be formatted to generate formatted sensor data. Accordingly, the first portion of the sensor data and the second portion of the sensor data need not be mutually exclusive portions of data, but rather commonly include data from one or more sensors. In some embodiments, the second portion of the sensor data is formatted base, at least in part, on an identity of the first external evidence repository. For example, different computer systems and servers may be configured to receive data having a specific format or formats. Accordingly, it may be advantageous to format the second data based, at least in part, on the identity of the external evidence repository. For example, the formatted may include encrypting the second portion of the sensor data.

In some embodiments, sensor data from respective sensors is encrypted in respective data streams. For example, a plurality of streams of image data from a respective plurality of cameras may each be encrypted individually. In some embodiments, the formatting includes selectively including metadata. For example, a portion of the sensor data may be used as metadata. For example, a time stamp or location of the UAV may be included with the sensor data. By way of further example, the metadata included with the sensor data may be encrypted as well. In some embodiments, the formatting includes formatting the second sensor data to comply with one or more standards of continuity of evidence. Various national and international organizations have established standards under which evidence may be deemed as admissible in court. In some embodiments, these standards include specify standards of capture, storage, transport, encryption, auditing, and modifying data. Accordingly, the formatting may include formatting the second sensor data to comply with one or more of these standards. Further, the encrypting of the sensor data and the formatting of the sensor data may be performed in any order, as desired. For example, the sensor data may first be encrypted, and then formatted based, at least in part, on the identity of the external evidence repository. Alternatively, the sensor data may be formatted based, at least in part, on the identity of the external evidence repository, and then encrypted. In further embodiments, the encryption and the formatting may be done substantially simultaneously.

At block 650, the first formatted sensor data is transmitted to the first external evidence repository. For example, the base station may transmit the first formatted sensor data to the first external evidence repository in real-time. Alternatively, the base station may first store the sensor data, either raw or formatted, in a storage device, such as a memory of the base station, and then transmit the formatted sensor data to the first external evidence repository at a later time. For example, the base station may store the sensor data while the anchor vehicle is on patrol, and then transmit the formatted sensor data upon detecting a secure synchronization point, such as a wireless network of a police station or fire station.

At block 660, a request to transition the UAV between a docked configuration and an aerial configuration is received at the base station. The request to transition the UAV may be received at any time. In some embodiments, the request to transition is received from a portable electronic device. For example, an officer associated with the anchor vehicle may transmit the request from a smartphone. In some embodiments, in which the base station is coupled to an electrical system of the anchor vehicle, the request may include data indicative of an operating state of the anchor vehicle. For example, data indicative that the anchor vehicle has been placed in "Park" may be received as a request to transition the UAV. At block 670, a control signal to transition the UAV between the docked configuration and the aerial configuration is transmitted. For example, the control signal may be a control signal to transition the UAV from the docked configuration to the aerial configuration. Alternatively, the control signal may be a control signal to transition the UAV from the aerial configuration and the docked configuration.

Figure 7:
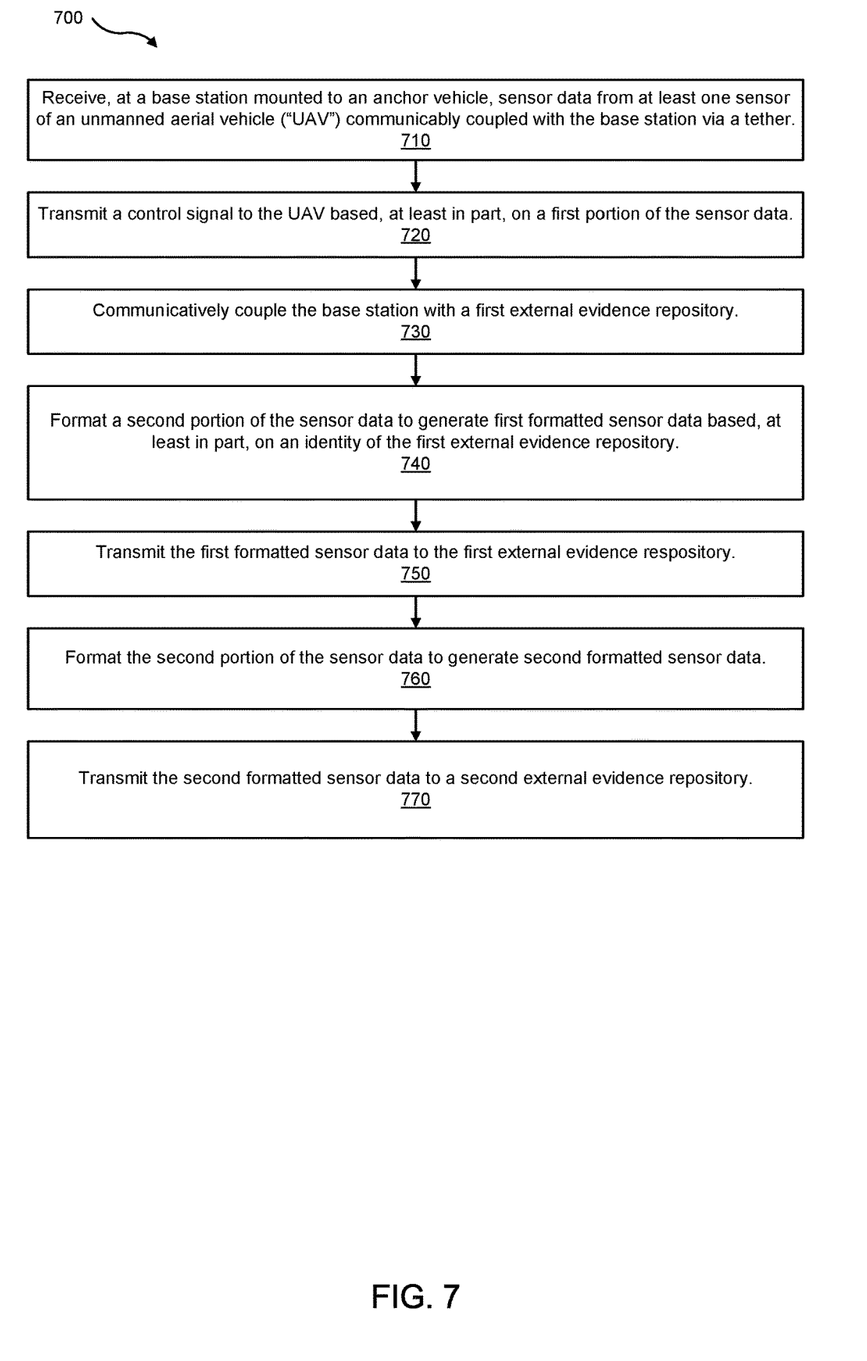
FIG. 7 is a flow diagram of a method of event auditing, according to some embodiments.

FIG. 7 is a flow diagram of a method 700 of event auditing, according to some embodiments. At block 710, sensor data from at least one sensor of an unmanned aerial vehicle ("UAV") is received at a base station mounted to an anchor vehicle. In some embodiments, the UAV is communicably coupled with the base station via a tether. The sensor data may include various sensor data from an ultrasonic sensor, a temperature sensor, an airspeed sensor, a barometric sensor, an orientation sensor, an accelerometer, or any other suitable sensor. In some embodiments, the sensor data includes a plurality of streams of image data from a respective plurality of cameras. At block 720, a control signal is transmitted to the UAV. In some embodiments, the control signal is transmitted from the base station. In some embodiments, the transmission of the control signal is based, at least in part, on a first portion of the sensor data. For example, during a period in which the UAV is in an aerial configuration, the control signal may be transmitted based on airspeed, orientation, and acceleration data, whereas data from the temperature sensor is simply logged. At block 730, the base station is communicably coupled with a first external evidence repository. For example, the base station may be coupled with a remote server of a hosting platform over one or more of wireless and wired communication.

At block 740, a second portion of the sensor data is formatted to generate first formatted sensor data. For example, orientation data, acceleration data, temperature data, and image data may be formatted to generate formatted sensor data. Accordingly, the first portion of the sensor data and the second portion of the sensor data need not be mutually exclusive portions of data, but rather commonly include data from one or more sensors. In some embodiments, the second portion of the sensor data is formatted base, at least in part, on an identity of the first external evidence repository. For example, different computer systems and servers may be configured to receive data having a specific format or formats. Accordingly, it may be advantageous to format the second data based, at least in part, on the identity of the external evidence repository. For example, the formatted may include encrypting the second portion of the sensor data.

In some embodiments, sensor data from respective sensors is encrypted in respective data streams. For example, a plurality of streams of image data from a respective plurality of cameras may each be encrypted individually. In some embodiments, the formatting includes selectively including metadata. For example, a portion of the sensor data may be used as metadata. For example, a time stamp or location of the UAV may be included with the sensor data. By way of further example, the metadata included with the sensor data may be encrypted as well. In some embodiments, the formatting includes formatting the second sensor data to comply with one or more standards of continuity of evidence. Various national and international organizations have established standards under which evidence may be deemed as admissible in court. In some embodiments, these standards include specify standards of capture, storage, transport, encryption, auditing, and modifying data. Accordingly, the formatting may include formatting the second sensor data to comply with one or more of these standards. Further, the encrypting of the sensor data and the formatting of the sensor data may be performed in any order, as desired. For example, the sensor data may first be encrypted, and then formatted based, at least in part, on the identity of the external evidence repository. Alternatively, the sensor data may be formatted based, at least in part, on the identity of the external evidence repository, and then encrypted. In further embodiments, the encryption and the formatting may be done substantially simultaneously.

At block 750, the first formatted sensor data is transmitted to the first external evidence repository. For example, the base station may transmit the first formatted sensor data to the first external evidence repository in real-time. Alternatively, the base station may first store the sensor data, either raw or formatted, in a storage device, such as a memory of the base station, and then transmit the formatted sensor data to the first external evidence repository at a later time. For example, the base station may store the sensor data while the anchor vehicle is on patrol, and then transmit the formatted sensor data upon detecting a secure synchronization point, such as a wireless network of a police station or fire station.

At block 760, the second portion of the sensor data is formatted to generate second formatted sensor data. For example, the base station may be communicably coupled to a mobile data terminal ("MDT") of the anchor vehicle over wired or wireless communication. In some embodiments, the MDT includes one or more storage devices. Accordingly, the second portion of the sensor data may be formatted for storage on the MDT. At block 770, the second formatted sensor data is transmitted to the second external evidence repository. For example, the second formatted sensor data may be transmitted to the MDT. Alternatively, the second formatted sensor data may be transmitted to a second remote server, such as over wireless communication.

Thus, the disclosure provides, among other things, an event auditing system including a base station, a UAV, and a tether extending between the base station and the UAV. Various features and advantages of the disclosure are set forth in the following claims.

What is claimed is:

1. A method of event auditing, comprising:
   receiving, at a base station mounted to an anchor vehicle, sensor data from at least one sensor of an unmanned aerial vehicle ("UAV"), the UAV communicatively coupled with the base station via a tether to receive sensor data;
   transmitting power to the UAV via the tether;
   formatting at least a portion of the sensor data to generate first formatted sensor data based, at least in part on an identity of a first external evidence repository;
   communicatively coupling the base station with the first external evidence repository; and
   transmitting the first formatted sensor data to the first external evidence repository.

2. The method of claim 1, further comprising:
   receiving, at the base station, a request to transition the UAV between a docked configuration and an aerial configuration; and
   transmitting a control signal to transition the UAV between the docked configuration and the aerial configuration.

3. The method of claim 2, wherein the request is received from a portable electronic device.

4. The method of claim 2, wherein the base station is coupled to a controller of the anchor vehicle, and wherein the request comprises data indicative of an operating state of the anchor vehicle.

5. The method of claim 1, further comprising:
   communicatively coupling the base station with a dedicated emergency channel; and
   transmitting at least a second portion of the sensor data via the dedicated emergency channel in real-time.

6. The method of claim 1, wherein the formatting comprises encrypting the portion of the sensor data.

7. The method of claim 1, wherein the formatting comprises selectively including metadata.

8. The method of claim 1, wherein the formatting comprises formatting the portion of the sensor data to comply with one or more standards of continuity of evidence.

9. The method of claim 8, wherein the first external evidence repository comprises a remote server, and wherein the communicatively coupling comprises coupling via wireless communication.

10. The method of claim 9, wherein the base station is communicatively coupled to a mobile data terminal ("MDT") of the anchor vehicle, and wherein the MDT is communicatively coupled to the remote server via wireless communication.

11. The method of claim 10, wherein a second external evidence repository comprises a storage medium of the MDT, and the method further comprises:
   formatting the portion of the sensor data to generate second formatted sensor data; and
   transmitting the second formatted sensor data to the second external evidence repository.

12. One or more non-transitory computer-readable media having computer-executable instructions recorded thereon, the computer-executable instructions configured to cause a computer processor to perform operations including:
   receiving, at a base station mounted to an anchor vehicle, sensor data from at least one sensor of an unmanned aerial vehicle ("UAV"), the UAV communicatively coupled with the base station via a tether to receive sensor data;
   transmitting power to the UAV via the tether;
   formatting a second portion of the sensor data to generate first formatted sensor data based, at least in part, on an identity of a first external evidence repository;
   communicatively coupling the base station with the first external evidence repository; and
   transmitting the first formatted sensor data to the first external evidence repository.

13. The non-transitory computer-readable media of claim 12, wherein the operations further include:
   receiving, at the base station, a request to transition the UAV between a docked configuration and an aerial configuration; and
   transitioning the UAV from the docked configuration to the aerial configuration.

14. The non-transitory computer-readable media of claim 13, wherein the request is received from a portable electronic device.

15. The non-transitory computer-readable media of claim 13, wherein the base station is coupled to a controller of the anchor vehicle, and wherein the request comprises data indicative of an operating state of the anchor vehicle.

16. The non-transitory computer-readable media of claim 13, wherein the operations further include:

communicatively coupling the base station with a dedicated emergency channel; and transmitting at least a second portion of the sensor data via the dedicated emergency channel in real-time.

17. The non-transitory computer-readable media of claim 12, wherein the formatting comprises encrypting the second portion of the sensor data.

18. The non-transitory computer-readable media of claim 12, wherein the formatting comprises selectively including metadata.

19. The non-transitory computer-readable media of claim 12, wherein the formatting comprises formatting the second sensor data to comply with one or more standards of continuity of evidence.

20. The non-transitory computer-readable media of claim 19, wherein the first external evidence repository comprises a remote server, and wherein the communicatively coupling comprises coupling via wireless communication.

21. The non-transitory computer-readable media of claim 20, wherein the base station is communicatively coupled to a mobile data terminal ("MDT"), and wherein the MDT is communicatively coupled to the remote server via wireless communication.

22. The non-transitory computer-readable media of claim 21, wherein the second external evidence repository comprises a storage medium of the MDT, and the operations further include:

formatting the second portion of the sensor data to generate second formatted sensor data; and transmitting the second formatted sensor data to the second external evidence repository.

23. A system for event auditing, comprising:

a base station mounted to an anchor vehicle, the base station including a controller communicatively coupled with a first external evidence repository; and an unmanned aerial vehicle ("UAV") coupled to the base station via a tether, wherein the controller is configured for receiving sensor data from at least one sensor of the UAV via the tether, transmitting power to the UAV via the tether, formatting a portion of the sensor data to generate formatted sensor data based, at least in part, on an identity of the first external evidence repository, and transmitting the first formatted sensor data to the first external evidence repository.

* * * * *